United States Patent [19]
de Concini

[11] Patent Number: 4,762,108
[45] Date of Patent: Aug. 9, 1988

[54] NON-LINEAR POSITION TRANSDUCER FOR DETECTING THE POSITION OF A VALVE CONTROLLING THE RATE OF FLOW OF AIR INDUCTED TO THE CYLINDERS OF A HEAT ENGINE

[75] Inventor: Roberto de Concini, Zola Predosa, Italy

[73] Assignee: Weber S.r.l., Turin, Italy

[21] Appl. No.: 28,315

[22] Filed: Mar. 20, 1987

[30] Foreign Application Priority Data

Mar. 21, 1986 [IT] Italy .................. 67226 A/86

[51] Int. Cl.⁴ ............................................. F02B 3/00
[52] U.S. Cl. ........................................ 123/488; 123/494
[58] Field of Search ................ 123/488, 494, 492; 338/184; 364/431.11

[56] References Cited

U.S. PATENT DOCUMENTS

| | | | |
|---|---|---|---|
| 3,612,008 | 10/1971 | Beishir | 123/494 |
| 4,051,818 | 10/1977 | Volckers | 123/494 |
| 4,217,863 | 8/1980 | Ezoe | 123/494 |
| 4,280,465 | 7/1981 | Staerzl | 123/494 |
| 4,308,838 | 1/1982 | Nakano | 123/494 |
| 4,355,293 | 10/1982 | Driscoll | 338/184 |
| 4,599,696 | 7/1986 | Takahashi | 364/431.11 |

*Primary Examiner*—Ronald B. Cox
*Attorney, Agent, or Firm*—Gifford, Groh, VanOphem, Sheridan, Sprinkle and Dolgorukov

[57] ABSTRACT

A non-linear position transducer for detecting the position of a valve controlling the rate of flow of air inducted to the cylinders of a heat engine comprising a first means for detecting the position of this valve, and second means coupled to the first means and operable to provide an electrical output signal in non-linear relationship with the position of the valve, and in which these second means comprise an electrical circuit having only passive components.

7 Claims, 1 Drawing Sheet

NON-LINEAR POSITION TRANSDUCER FOR DETECTING THE POSITION OF A VALVE CONTROLLING THE RATE OF FLOW OF AIR INDUCTED TO THE CYLINDERS OF A HEAT ENGINE

BACKGROUND OF THE INVENTION

The present invention relates to a non-linear position transducer for detecting the position of a valve controlling the rate of flow of air inducted to the cylinders of a heat engine, and particularly a butterfly valve controlled by an accelerator of this engine, conveniently one provided with an electronic injection system.

As is known, in such electronic injection systems for heat engines there is an electronic central processor which, in dependence on signals it receives from the various sensors, and via interpolation on memorised mappings, controls a plurality of injectors (in the case of multi-injector systems) or the individual injector (in the case of single injector systems), and also conveniently controls the ignition system.

To provide particular operating strategies of the electronic central control unit, signals from supplementary sensors, such as, for example, a sensor detecting the angular position of the butterfly valve, are provided to the central control unit, which signals can indicate the absolute angular value or a variation over successive instants. Usually a linear potentiometer is utilized as this position transducer which gives a sufficient guarantee of reliability and accuracy with a relatively low cost, this being coupled to a successive analogue-to-digital converter which supplies the signal to the central control unit.

In certain particular operating conditions, especially in transient conditions, and in the initial opening range of the valve, in which there is a wide variation in the rate of flow of air, the signal provided to the central control unit can have an insufficient resolution, limited by that of the analogue-to-digital converter, which is generally an eight bit device, and by the characteristics of the potentiometer, so that the operating sensitivity of the system can be inadequate in some cases.

Sometimes, therefore, potentiometers with non-linear characteristics have been adopted, (for example, logarithmic) or double ramp potentiometers, but these solutions are significantly more expensive and less accurate.

SUMMARY OF THE INVENTION

The object of the present invention is that of providing a position transducer for detecting the position of the valve controlling the rate of flow of air, which in a simple and economic manner, and utilising the same potentiometer having linear characteristics and the same analogue-to-digital converter, allows the above indicated disadvantages to be overcome, that is to say, allows different resolutions to be obtained according to what is desired, in different parts of the range of positions of this control valve.

According to the present invention there is provided a non-linear transducer for detecting the position of a valve controlling the rate of flow of air inducted to the cylinders of a heat engine, comprising first means sensitive to the position of the said valve, and second means coupled to the said first means and operable to provide an electrical output signal in non-linear relation with the position of the said valve, characterized by the fact that the said second means comprise an electrical circuit having only passive components.

BRIEF DESCRIPTION OF THE DRAWINGS

For a better understanding of the present invention a particular embodiment is now described, purely by way of non-limitative example, with reference to the attached drawings, in which.

DETAILED DESCRIPTION OF THE INVENTION

Figure 1:
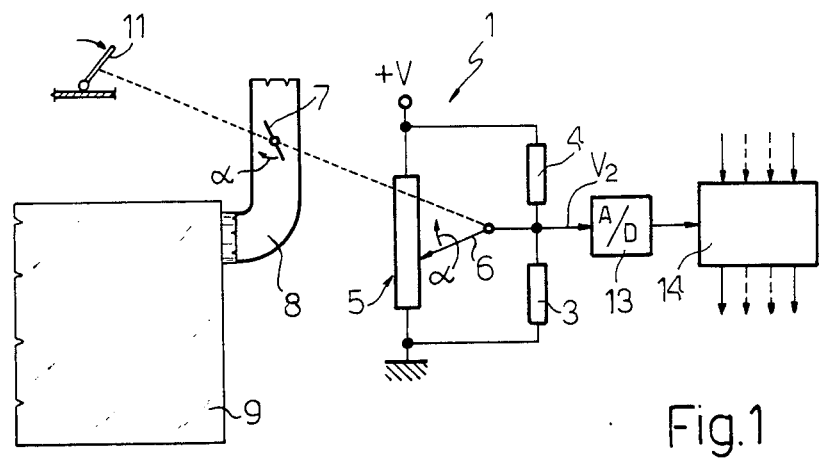
FIG. 1 is a schematic view of the transducer of the present invention together with a block schematic diagram of an injection system for a heat engine; and, FIG. 2 illustrates an operating curve of the transducer of FIG. 1.

With reference to FIG. 1, the reference numeral 1 indicates the transducer of the present invention, which comprises a pair of series connected resistors 3 and 4 having resistance values of $R_3$ and $R_4$ respectively and the ends of which are connected to the ends of a potentiometer 5 having linear characteristics, across which is applied a voltage between $+V$ and earth. This potentiometer 5 has a cursor 6 angularly fixed to the spindle of a butterfly valve 7, disposed in an induction manifold 8 of a heat engine 9, and controlled by the accelerator pedal 11. In particular, the total resistance value $R_T$ of the potentiometer 5 is divided, according to the position of the cursor 6, into a resistance value $R_1$ between the cursor 6 and earth, and proportional to the opening angle $\alpha$ of the butterfly valve 7 for which $R_1 = K_1\alpha$, and a value $R_2 = R_T - R_1$. The potentiometer cursor 6 is therefore electrically connected to the connection node between the resistors 3 and 4, from which node is taken a voltage signal $V_2$ which arrives at the input of an analogue-to-digital convertor block 13, for example an eight bit device, the output of which is connected to an input of a central electronic control unit 14 of known type for an electronic injection system, which receives other input signals from various sensors and is operable to provide output signals for control of the injection and, possibly also for the ignition of the engine 9.

Figure 2:
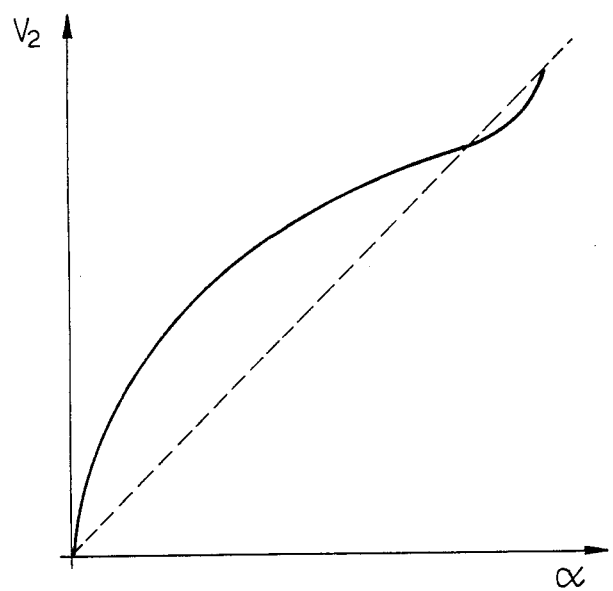

The voltage value $V_2$ is therefore given by the following relation:

$$V_2 = V \frac{1}{1 + \frac{R_1 + R_3}{R_1 \cdot R_3} \cdot \frac{R_2 \cdot R_4}{R_2 + R_4}}$$

and since $R_1 = K_1\alpha$, one has:

$$V_2 = V \frac{1}{1 + \frac{K_1\alpha + R_3}{K_1\alpha \cdot R_3} \cdot \frac{(R_T - K_1\alpha) R_4}{R_T - K_1\alpha + R_4}}$$

from which, in dependence on the variation of the opening angle $\alpha$ of the butterfly valve 7, the voltage $V_2$ varies in a non-linear manner as represented, for example, in FIG. 2, in which the values of the angle $\alpha$ are plotted along the abscissa and the values of the voltage $V_2$ along the ordinate. In this way there is a different sensitivity for the output signal $V_2$ in different ranges of variation of the angle $\alpha$ and this different sensitivity is adjustable as desired in dependence on the pre-selected values for the resistors 3 and 4 and for the total value of the potentiometer 5. In particular, as illustrated in FIG. 2, with respect to a linear transfer function (indicated in broken outline) one can have a greater sensitivity for a wide first part of the opening angle α, which is in the range of greater interest in precision in that reduced variations of the angle α cause significant variations in the quantity of air inducted to the engine 9.

With the transducer of the present invention there is therefore the advantage of obtaining different resolutions for different ranges of the angular position of the butterfly valve 7 in dependence on what is considered preferable for the operating strategy adopted by the central control unit 14, with a simple, reliable and economic arrangement which utilizes only passive components, in combination with a potentiometer having only a linear characteristic and an analogue-to-digital convertor having a not particularly high resolution, for example, an eight bit device.

The central electronic control unit 14 can conveniently detect variations in the angular position of the butterfly valve 7, or the absolute value, and in this case the characteristic non-linear curve of the transducer 1, illustrated in FIG. 2 for example, can conveniently be stored in the central processing unit 14.

Finally, it is clear that the embodiment of the present invention described here can have modifications and variations introduced thereto which do not depart from the ambition of the invention itself. For example, the transducer 1 can be fitted to control a rectilinear displacement valve (for example, a gate valve) instead of a rotary butterfly valve.

I claim:

1. A non-linear position transducer (1) for detecting the position of a valve (7) for controlling the rate of flow of air inducted to the cylinders of a heat engine (9), comprising first means (5) for detecting the position (α) of the said valve (7) and second means (3,4) coupled to the said first means (5) and operable to provide an electric output signal ($V_2$) in non-linear relation to the position (α) of the said valve (7), characterised by the fact that the said first and second means (3,4,5) comprise an electrical sensing circuit, said sensing circuit further comprising a first and second resistor connected in parallel with each other and forming a first resistor pair, a first end of said resistor pair being connected to a voltage level, a third and fourth resistor connected in parallel with each other and forming a second resistor pair, a first end of said second resistor pair being connected to a second voltage level different from said first voltage level, the other ends of said resistor pairs being electrically connected together, said electrical output signal being present at said other ends of said resistor pairs, wherein said second means comprises means for varying the resistive values of the first and third resistors inversely with respect to each other as a function of the valve position and wherein said sensing circuit is constructed wholly from passive components.

2. A transducer according to claim 1, characterised by the fact that said first means comprises a potentiometer (5) having a linear characteristic, the cursor (6) of which is tied to the position (α) of said valve (7) and is electrically connected to said second means (3,4), said potentiometer also forming said first and third resistors.

3. A transducer according to claim 2, characterised by the fact that said cursor (6) is connected to an intermediate node of said second and fourth resistors (3,4).

4. A transducer according to claim 1, characterised by the fact that said electrical output signal (V) from said second means (3,4) is electrically connected to an analog-to-digital converter (13).

5. A transducer according to claim 4, characterised by the fact that said analog-to-digital converter (13) is of the eight bit type.

6. A transducer according to claim 4, characterised by the fact that said converter (13) generates output signals to an electronic central control unit (14) of an electronic injection system.

7. A transducer according to claim 1, characterised by the fact that the position (α) of said valve 7 is controlled by means of an accelerator (11) of said engine (9).

* * * * *